United States Patent
Ito

(10) Patent No.: US 10,477,063 B2
(45) Date of Patent: Nov. 12, 2019

(54) CHARACTER DETECTION AND BINARIZATION

(71) Applicant: CANON KABUSHIKI KAISHA, Tokyo (JP)

(72) Inventor: Naoki Ito, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/296,290

(22) Filed: Jun. 4, 2014

(65) Prior Publication Data

US 2014/0285824 A1     Sep. 25, 2014

Related U.S. Application Data

(63) Continuation of application No. 12/554,766, filed on Sep. 4, 2009, now abandoned.

(30) Foreign Application Priority Data

Sep. 18, 2008  (JP) ................................. 2008-239804

(51) Int. Cl.
*H04N 1/41* (2006.01)
*H04N 1/409* (2006.01)
(Continued)

(52) U.S. Cl.
CPC ....... *H04N 1/3871* (2013.01); *G06K 9/00456* (2013.01); *G06K 9/00463* (2013.01);
(Continued)

(58) Field of Classification Search
USPC ........ 358/1.2, 2.1, 1.11, 1.18; 382/173, 176, 382/177, 180
See application file for complete search history.

(56) References Cited

U.S. PATENT DOCUMENTS 5,392,362 A    2/1995 Kimura et al.
5,530,559 A *  6/1996 Sato ............................ 358/2.99
(Continued)

FOREIGN PATENT DOCUMENTS

JP    1130957 A   5/1989
JP    9251291 A   9/1997
(Continued)

OTHER PUBLICATIONS

Japanese Office Action dated Jul. 24, 2012 corresponding to Japanese Patent Application No. 2008-239804.

*Primary Examiner* — Peter K Huntsinger
(74) *Attorney, Agent, or Firm* — Venable LLP

(57) ABSTRACT

There is provided an image processing apparatus which can generate a vector image with a high image quality at a high speed in a small memory capacity. The present invention generates an image with low resolution by performing resolution conversion to a compressed image with high resolution and obtains information of a character object with low resolution by performing object division to the image with the low resolution. The compressed image with the high resolution is decompressed and an image showing a character contour with high resolution is generated by using the information of the character object with the low resolution obtained by the object dividing and the decompressed image with the high resolution. At the time of performing the decompression, the compressed image with the high resolution may be partially decompressed based upon the information of the character object.

8 Claims, 19 Drawing Sheets

(51) Int. Cl.
  *G06K 9/00* (2006.01)
  *G06K 15/02* (2006.01)
  *G06K 9/46* (2006.01)
  *G06K 9/48* (2006.01)
  *H04N 1/387* (2006.01)

(52) U.S. Cl.
  CPC ........... *G06K 9/4604* (2013.01); *G06K 9/481* (2013.01); *G06K 15/1872* (2013.01); *H04N 1/4092* (2013.01); *H04N 1/41* (2013.01)

(56) References Cited

U.S. PATENT DOCUMENTS

| | | | |
|---|---|---|---|
| 5,778,159 A | 7/1998 | Ito | |
| 5,956,468 A * | 9/1999 | Ancin | G06K 9/38 358/1.9 |
| 6,417,841 B1 | 7/2002 | Doi et al. | |
| 6,873,436 B1 | 3/2005 | Terada et al. | |
| 2004/0042038 A1 | 3/2004 | Uejo | |
| 2005/0280841 A1 | 12/2005 | Bossut et al. | |
| 2006/0171587 A1* | 8/2006 | Kanatsu | 382/173 |
| 2007/0262992 A1* | 11/2007 | Ito | G06K 9/34 345/467 |
| 2007/0286478 A1 | 12/2007 | Kishi | |

FOREIGN PATENT DOCUMENTS

| | | |
|---|---|---|
| JP | 2000-184219 A | 6/2000 |
| JP | 2001-051670 A | 2/2001 |
| JP | 2002-142128 A | 5/2002 |
| JP | 2003-072161 A | 3/2003 |
| JP | 2004-229095 A | 8/2004 |
| JP | 2008-108178 A | 5/2008 |

* cited by examiner

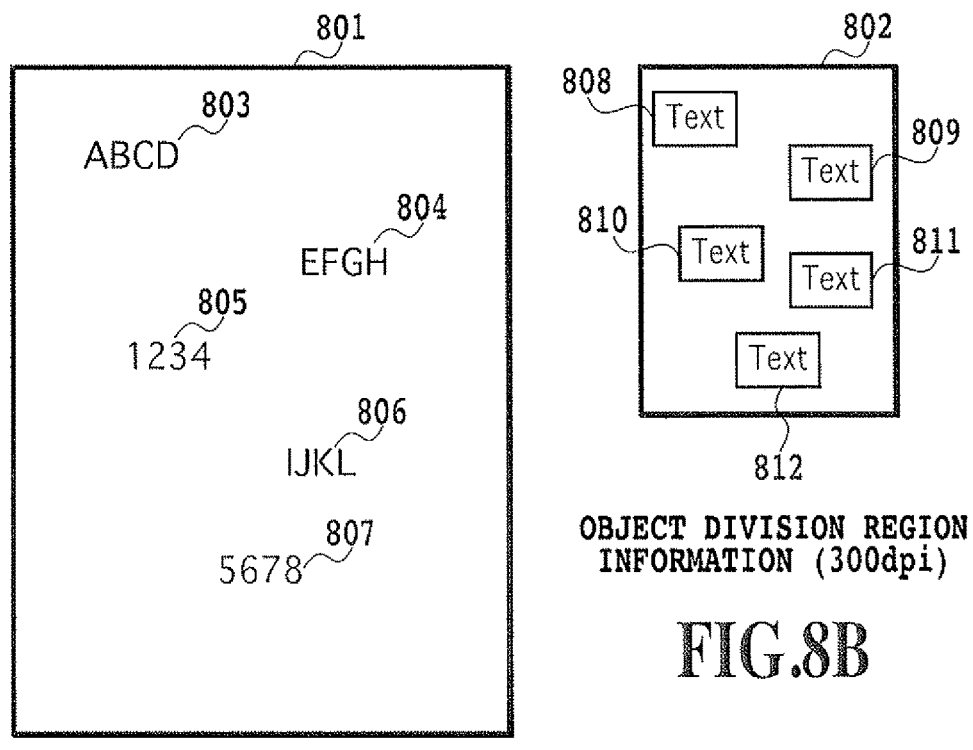
FIG.8A COMPRESSED IMAGE (600 dpi)
FIG.8B OBJECT DIVISION REGION INFORMATION (300dpi)
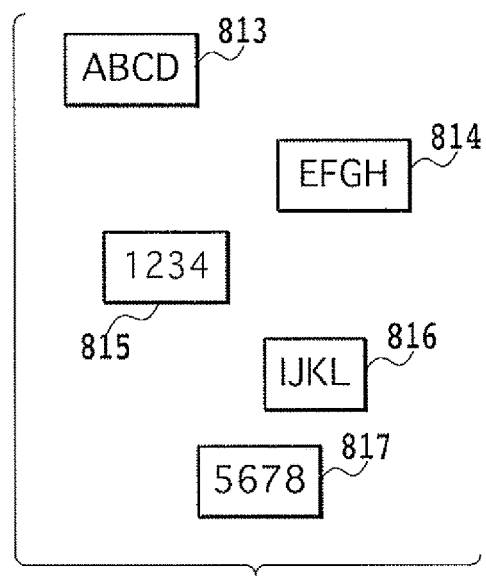
FIG.8C

BLOCK INFORMATION

| | ATTRIBUTE | COORDINATE X | COORDINATE Y | WIDTH W | HEIGHT H | OCR INFORMATION |
|---|---|---|---|---|---|---|
| BLOCK 1 | 1 | X1 | Y1 | W1 | H1 | PRESENCE |
| BLOCK 2 | 3 | X2 | Y2 | W2 | H2 | PRESENCE |
| BLOCK 3 | 2 | X3 | Y3 | W3 | H3 | ABSENCE |
| BLOCK 4 | 1 | X4 | Y4 | W4 | H4 | PRESENCE |
| BLOCK 5 | 3 | X5 | Y5 | W5 | H5 | PRESENCE |
| BLOCK 6 | 2 | X6 | Y6 | W6 | H6 | ABSENCE |

\* ATTRIBUTE 1:CHARACTER, 2:PHOTO, 3:GRAPHIC

INPUT FILE INFORMATION

| SUM OF BLOCKS | N (=6) |
|---|---|

FIG.15

```
<?xml version="1.0"?>
<svg:svg xmlns:svg="http://www.w3.org/2000/svg" xmlns:xlink="http://www.w3.org/1999/xlink"
xmlns:rcd="http://www.canon.com/ns/rcd" width="606" height="862"viewBox="0 0 2361 3388">
```

```
<svg:image  x="0" y="0" width="1240" height="1760"
xlink:href="data:image/jpeg;base64,/9j/2wCEAB8VFxsXEx8bGRsjIR8kLkOyLioqLl5DRzhNb2J1c21ibGp7irG
We4OnhGpsmtGcp7a8xsjGd5TZ6NfA5rHCxr4BISMjLiguWjIyWr5/bH++vr6+vr6+vr6+vr6+vr6+vr6+vr6+vr6+
:
FFABRQB//ZAAA=">                                                                        1801
</svg:image>
```

```
<svg:svg x="188" y="284" width="896" height="148" rcd:qType="stringText">
       <svg:text fill="#020202" font-size="150">
          <svg:tspan y="144" x="0 149 299 449 609 750">CANON TARO</svg:tspan>
       </svg:text>                                                                       1802
</svg:svg>
```

```
<svg:svg x="188" y="284" width="896" height="148" rcd:qType="vectorText">
  <svg:g fill="#020202">                                                                 1803
     <path d=" M123.3,779h1.2c2.4,0 10.7,3.1 10.7,4v12h1.4q1.4,0 3.8,-1q2.4,-1 8.6,-4h1c3.5,0 8,
     2.8 8,5v2q-14,2 -20,2v3q0,3 2,6.6v2.4h2q2,0 6.9,-1.5q5,-1.5 12.1,-4.5h0.5c3.3,0 9.5,3.3 9.5,
     5c0,0.8 -23.6,6 -27,6h-1v3q7,22 7,23c0,0.8 -3.2,4 -4,4c-3.1,0 -4.9,-3.4 -6.8,-12.3c-1.4,-7
     -2,-9.4 -3,-11.7q-0.2,-0.4 -0.2,-0.7v-2.4h-2q-2,0 -7.5,2.3q-5.5,2.2 -13,5.7c-3.2,0 -9.5,-6.7
     -9.5,-10v-2h3q3.1,2.4 4.1,3.2q0.9,0.8 1.9,0.8c4,0 21,-5.7 21,-7q-2,-5 -2,-9v-1h-3q-3,0 -6.1,
     1.3q-3.2,1.3 -8.9,3.7h-0.5c-3.4,0 -9.5,-5.1 -9.5,-8c0,-1 1.3,-3 2,-3q3,3 5,3h4q10,-2 14,-2v
     -2.5c0,-3.8 -3.8,-10.5 -6,-10.5h-3v-1.5c0,-0.3 3,-3.5 3.3,-3.5z"/>
     <path d=" M199,781h1c2.4,0 9.6,2.2 9.6,3v15h3.2q3.2,0 11.1,-2q7.8,-2 16.1,-5c2.2,0 8,5.8 8,
     8v2h-5q0,0 0,0c-1,2.7 -23.2,18 -26,18h-1v2.5q5,18.5 5,21v0.5c0,1.2 -2.1,4 -3,4c-4.1,0 -5.2,
     -1.9 -6.8,-12.8c-2.1,-14.2 -3.6,-22.2 -5,-26.2q-0.2,-0.4 -0.2,-0.7v-2.4h-1.5q-1.5,0 -7.6,
     2.3q-6.2,2.3 -10.9,4.7c-2.9,0 -8,-6.1 -8,-9.5v-2.5h2q3.1,2.4 4.1,3.2q0.9,0.8 1.9,0.8q12,-3
     18,-3v-3c0,-6.7 -3.4,-13 -7,-13h-2v-2c0,-1 2.7,-3 4,-3m34,19c-4,0 -21,4.9 -21,6q2,6 2,11h1.5
     c1.9,0 17.5,-14.2 17.5,-16v-1z"/>
     :
  </svg:g>
</svg:svg>
```

```
<svg:svg x="193" y="631"width= "311" height="205" rcd:qType="vectorLineArt">            1804
  <svg:path fill="none" stroke="#000000" stroke-width="1.0" stroke-linecap="square"
     d="M1724,2367c-5.5,0 -15.2,12.3 -27,34c-8.2,15 -15,17.2 -79.1,24.5c-37.4,4.3 -63.9,10.1
  -63.9,14q0,0.3 0.2,0.4c2.2,1.6 2.5,2.1 3.6,4.5
    c1.3,3.3 1.9,3.6 6.2,3.6h2q2,0 3.5,2c0.3,0 1.5,-1.2 1.5,-1.5c0,-0.3 3.1,-1.5 4,-1.5q2,0 2.5,
    0.5q0.5,0.5 7.5,5.5h12c5.7,0 13,6.7 13,12c0,10.5 -16.3,23 -30,23q-4,0 -6.6,-1.5q-2.7,-1.5
    -12.4,-10.5q-7,4 -9.5,4c-4.2,0 -12.3,-6.6 -12.3,-10v-11h-3.2c-5.4,0 -20,27.7 -20,38c0,2.8
    3.6,5 8,5h140c4.9,0 12,-4.2 12,-7q0,-1 -3,-6v-3.5c0,-22.1 30.5,-49.5 55,-49.5q2.3,0 41,
    1.6q5,0.2 13.5,2.4q3.5,0 8.5,-2c23.2,0 54,27.9 54,49q0,4 -0.5,4.4q-0.5,0.3 -3.5,5.1c0,1.6
    6.4,4.5 10,4.5h3.5c36,0 68.5,-5.7 68.5,-12c0,-31.1 -17.8,-49.1 -64,-64.5q-25.1,-8.4 -30.4,
    -12.5q-6.1,-4.8 -16.1,-24c-6.5,-12.5 -15.6,-21 -22.5,-21h-66v0z"/>
       :
</svg:svg>

</svg:svg>
```

FIG.18

(1) LOW-RESOLUTION VECTOR IMAGE  (2) VECTOR IMAGE USING HIGH RESOLUTION

FIG.19

CHARACTER DETECTION AND BINARIZATION

This application is a continuation of U.S. application Ser. No. 12/554,766, filed Sep. 4, 2009 (pending), the contents of which are incorporated by reference herein.

BACKGROUND OF THE INVENTION

Field of the Invention

The present invention relates to an image processing apparatus which performs character vectorization process to a character object recognized by an object recognition process in a case of generating vectorization data from an input image.

Description of the Related Art

For example, Japanese Patent Laid-Open No. 2002-142128 discloses an image processing apparatus configured to have the following construction as an image processing apparatus capable of generating a color document image with high quality.

An input image is converted into an image with low resolution. The converted image with the low resolution is used to generate a subtractive color image, and neighboring pixels allotted to the same representative color from the subtractive color image are integrated to extract a FCR (Flat Color Region) candidate region. An image having higher resolution than the subtractive color image is used to once more determine the region candidate. Next, a boundary of the FCR is detected to determine a final FCR, and a representative color of the determined FCR is selected to perform a coloring process for replacing a color close to a pure color for the pure color. Finally the FCR is drawn over (combined to) the input image to perform reproduction of the image.

Computerization of documents has been conventionally made, but a memory capacity necessary for computerizing the document so as to have high quality, as well as in a state of being reusable becomes large and since a great amount of calculations is required for computerizing the document, it takes time to perform the computerization process. In particular, in the limited process resource, the computerization of the document has to be realized in a small memory capacity. For the realization, it is required to restrict a data amount to be processed as many as possible, but reduction of the data amount to be processed prevents a good image quality from being obtained. In a case of computerizing the document in the limited process resource, the memory capacity necessary for the computerizing is designed to be restricted by compressing data to be processed. However, there is a problem that only the compression of the data can reduce the necessary memory capacity, but can not obtain a good image quality.

SUMMARY OF THE INVENTION

An image processing apparatus in the present invention comprises a resolution converting unit configured to generate an image with low resolution by performing resolution conversion to a compressed image with high resolution, an object dividing unit configured to obtain information of a character object with low resolution by performing object division to the image with the low resolution, a decompressing unit configured to decompress the compressed image with the high resolution, and a character contour generating unit configured to generate an image showing a character contour with high resolution by using the information of the character object with the low resolution obtained by the object dividing unit and the image with the high resolution decompressed by the decompressing unit.

According to the present invention, it is possible to generate a vector image with a high image quality at a high speed in a small memory capacity.

Further features of the present invention will become apparent from the following description of exemplary embodiments (with reference to the attached drawings).

BRIEF DESCRIPTION OF THE DRAWINGS

FIG. 8A to 8C are diagram explaining the flow of the partial decompressing process according to the second embodiment;

FIG. 15 is diagrams showing attribute block information and input file information;

FIG. 18 is diagrams each showing an example of a format of data vectorized by a function approximate process; and FIG. 19 is a diagram showing an effect obtained by an application of the present embodiment.

DESCRIPTION OF THE EMBODIMENTS

Hereinafter, embodiments of the present invention will be explained with reference to the drawings.

First Embodiment

Image Processing System

Figure 1:
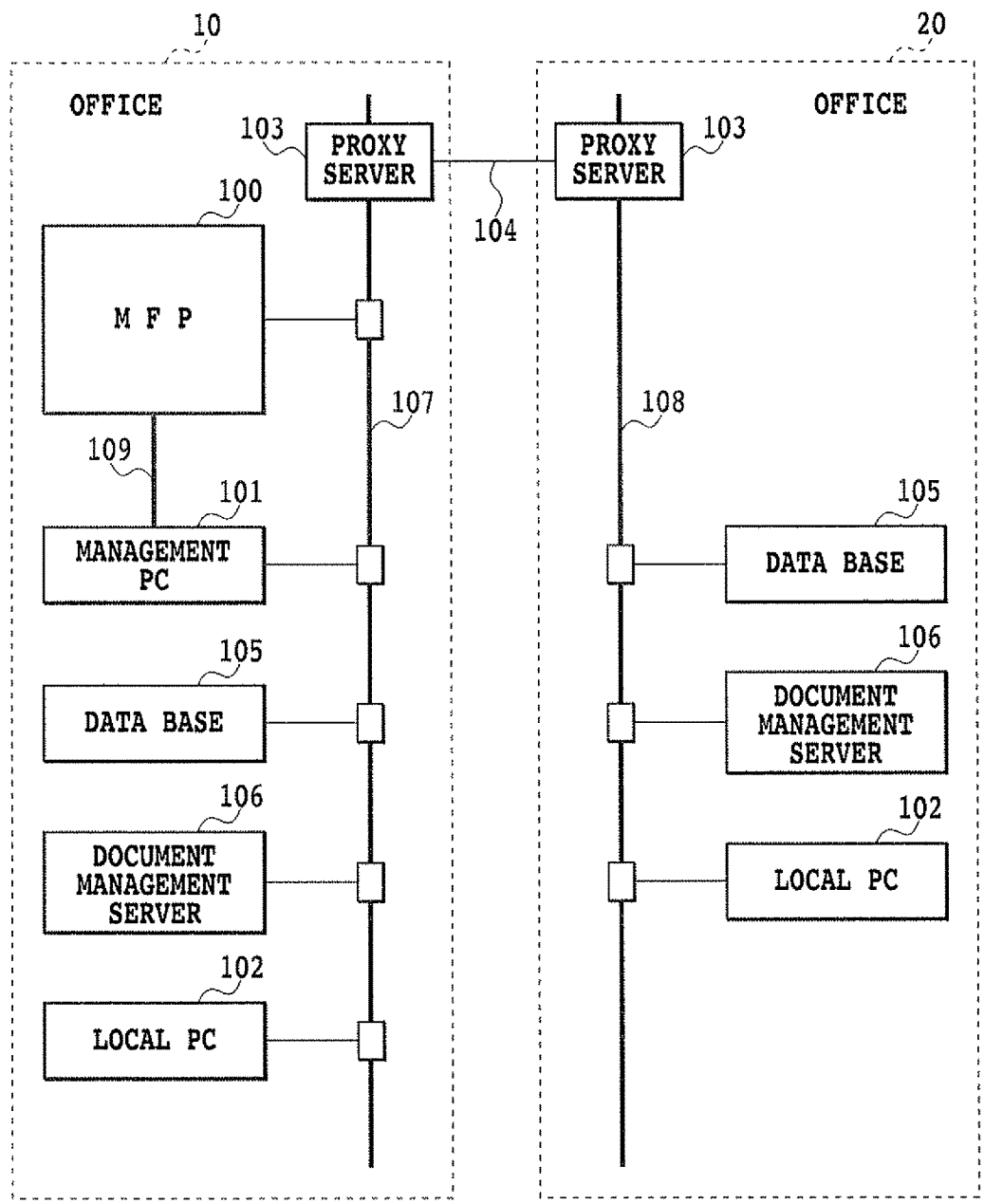
FIG. 1 is a block diagram showing a construction of an image processing system according to embodiments in the present invention.

FIG. 1 is a block diagram showing a construction of an image processing system according to embodiments in the present invention.

The image processing system is configured of an office 10 and an office 20 each provided with various devices. The office 10 is provided with a LAN 107 built therein and the office 20 is provided with a LAN 108 built therein, and are further connected with each other through the Internet 104.

The office 10 is provided with a multifunction peripheral (hereinafter, referred to as (MFP)) 100, a management PC 101 for controlling the MFP 100, a local PC 102, a proxy server 103, a data base 105, and a document management server 106. These devices are connected by the LAN 107.

The office 20 is provided with a local PC 102, a proxy server 103, a data base 105, and a document management server 106. These devices are connected by the LAN 108.

The LAN 107 and the LAN 108 are connected respectively to the proxy servers 103 and are connected through the respective proxy servers 103 to the Internet 104.

The MFP 100 performs a part of image processing to an input image read from a document and transmits the image-processed image data through the LAN 109 to the management PC 101. In addition, the MFP 100 interprets a PDL (Page Description Language) language received through the LAN 107 from the local PC 102 or a general PC (not shown) and prints out the interpreted language. Further the MFP 100 transmits the image data read from the document through LAN 107 to the local PC 102 or the general PC.

The management PC 101 is a computer including am image storage unit, am image processing unit, a displaying unit, an input unit (not shown) and the like. The management PC 101 performs the image process in cooperation with the MFP 100. It should be noted that in the present embodiment, the management PC 101 performs a registration process to be described hereinafter and the like to the data base 105, but the MFP 100 itself may be configured to perform the registration process.

[MFP]

Figure 2:
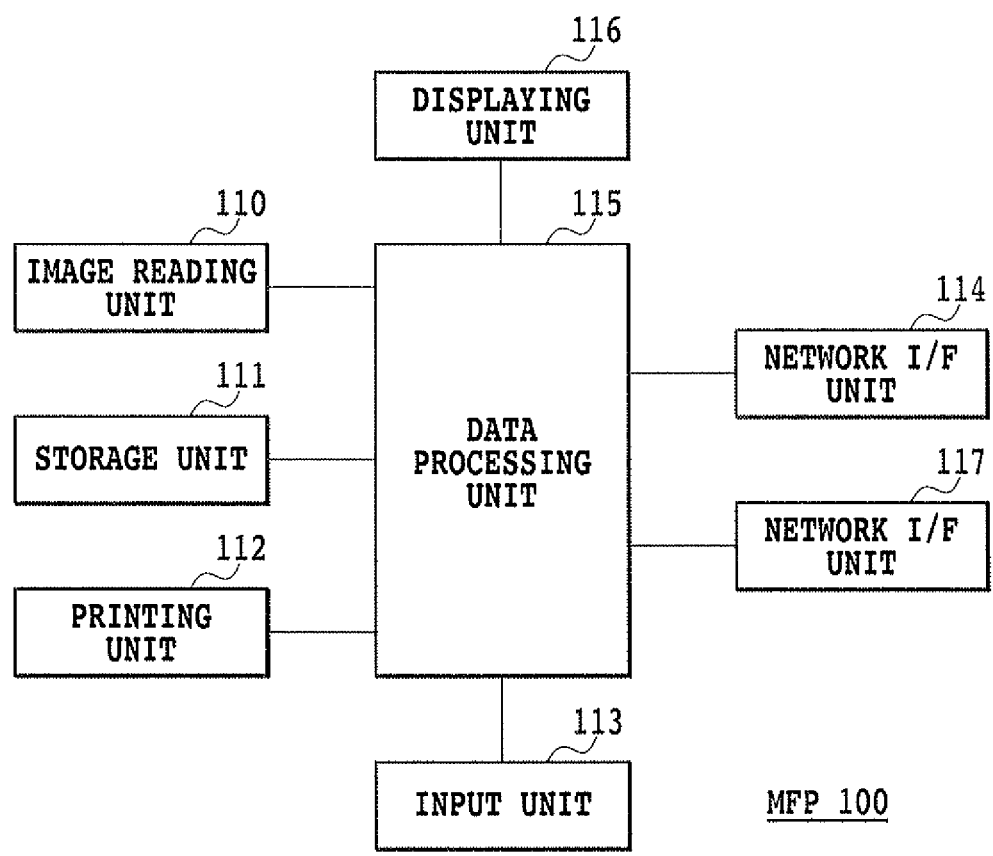
FIG. 2 is a block diagram showing a construction of MFP.

FIG. 2 is a block diagram showing a construction of the MFP 100.

The MFP 100 is provided with an image reading unit 110, a storage unit (box) 111, a printing unit 112, an input unit 113, network I/F units 119 and 117, and a data processing unit 115.

The image reading unit 110 is configured of a scanner having an auto document feeder. The image reading unit 110 emits light on images in a bundle of documents or in one document and makes image formation of the reflected light on a solid image pickup device. The solid image pickup device generates an image signal with a predetermined resolution (for example, 600 dpi) and a predetermined luminance level (for example, 8 bits). This image signal is formed of image data made of raster data.

The data processing unit 115, at the time of regular copying, performs the image process for copying to the image data received from the image reading unit 110 and converts the processed image data into print data, which are outputted to the printing unit 112. In a case of copying plural documents, the data processing unit 115 stores the print data corresponding to one page in the storage unit 111 once and thereafter, sequentially outputs the print data to the printing unit 112. The printing unit 112 prints an image or the like on a print paper based upon the print data. The data processing unit 115 interprets and processes a PDL language received through the network I/F 114 from the local PC 102 or the other general PC (not shown) to generate print data, which are outputted to the printing unit 112.

The storage unit 111 has a function for storing data performing rendering to the image data received from the image reading unit 110 or the PDL data received from the local PC 102. The storage unit 111 is controlled directly by the management PC 101 through the network I/F 117 and the LAN 109.

The input unit 113 is provided with operational interfaces, such as a touch panel and a key board, and receives an operational input from a user. The MFP 100 is also operable by operating a key board, a pointing device or the like which is provided in the management PC 101.

A displaying unit 116 displays a status, image data and the like in the MFP 100.

Figure 3:
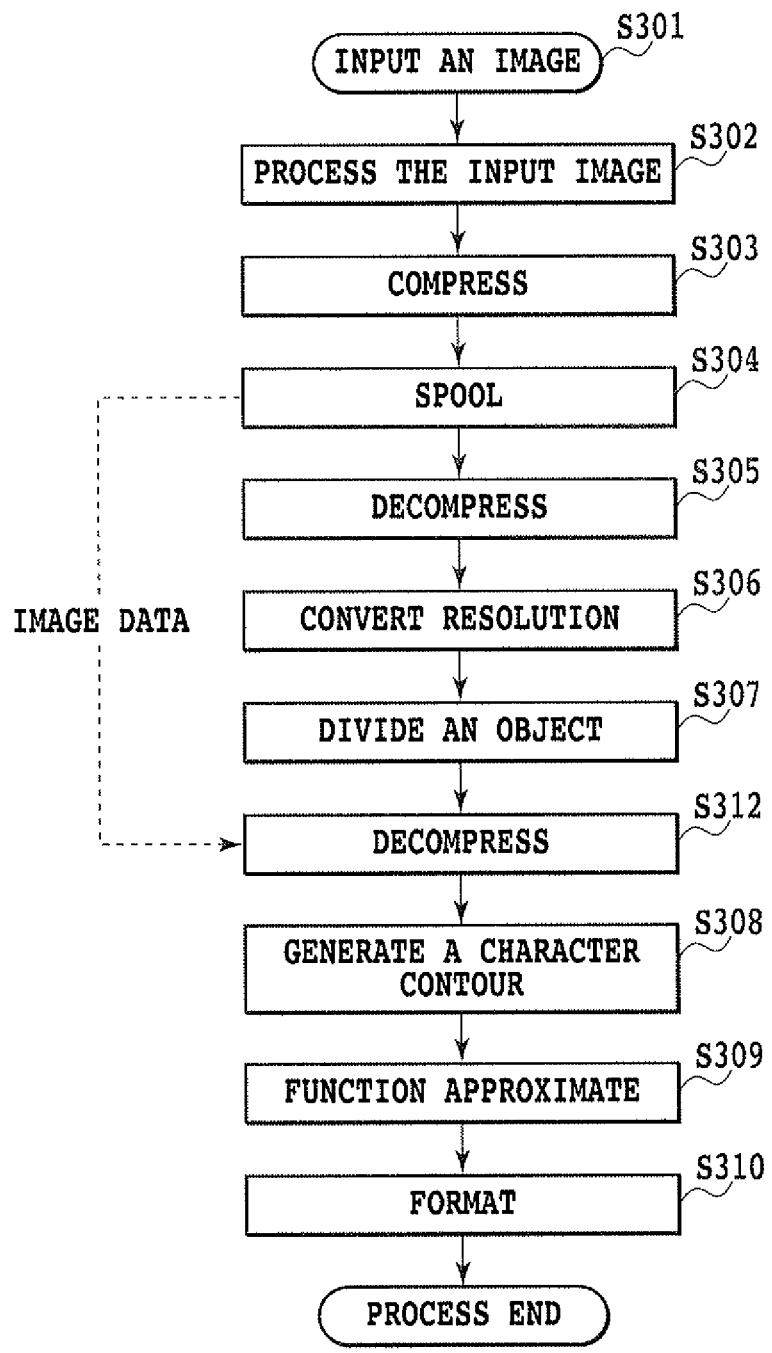
FIG. 3 is a flow chart showing the process flow according to a first embodiment.

FIG. 3 is a flow chart showing the flow of the vectorization process according to the first embodiment.

At step S301, the MFP 100 inputs an image using the image reading unit 110.

At step S302, the MFP 100 performs an image process to the input image in accordance therewith. The image process is, for example, a known process such as color conversion or a filtering process.

At step S303, the MFP 100 performs a compressing process to the image-processed image data to generate compressed image data. An example of a compressing method includes JPEG.

At step S304, the MET 100 spools the compressed image data in the storage unit 111. The storage unit 111 is, for example, a memory or a hard disc.

At step S305, the MFP 100 performs a decompressing process to the spooled compressed image data. For example, in a case where at step S303, the image is compressed by JPEG, the decompressing process to the compressed image is performed by JPEG. That is, at step S305, a decompressing method corresponding to the compressing method used at step S303 is used.

At step S306, the MFP 100 performs a resolution converting process for reducing resolution of the decompressed image data. For example, the image data with the resolution of 600 dpi are converted into the image data with the resolution of 300 dpi.

At step S307, the MFP 100 performs an object dividing process (region dividing process) to the image data after the resolution conversion is made. An example of the object kind includes a character object, a photo object, a graphic (drawing, line drawing or table) object, and a background object.

At step S312, the MFP 100 decompress the image data compressed at step S303.

At step S308, the MFP 100 performs a character contour generating process to the character object. Here, the MFP 100 refers to a portion in the image data with the high resolution corresponding to the character object to generate a contour of the character. Specifically, the contour of the character is generated based upon the character object divided at step S307 and the image data decompressed at step S312. That is, the MFP 100 generates the contour of the character using the character object divided from the image data with the low resolution and the image data with the high resolution after the decompressing. A detail of this character contour generating process will be described later.

At step S309, the MFP 100 performs a function approximate process to the character contour generated at step S308, which is converted into path data (vector data).

At step S310, the MFP 100 formats the path data to a general format. An example of the general format includes PDF, XPS, SVG or XML. It should be noted that the MFP 100 may store the formatted data in the storage unit 111 or transmit it through the network to an external device such as PC.

Next, the aforementioned process will be explained more specifically with reference to FIG. 4.

Figure 4:
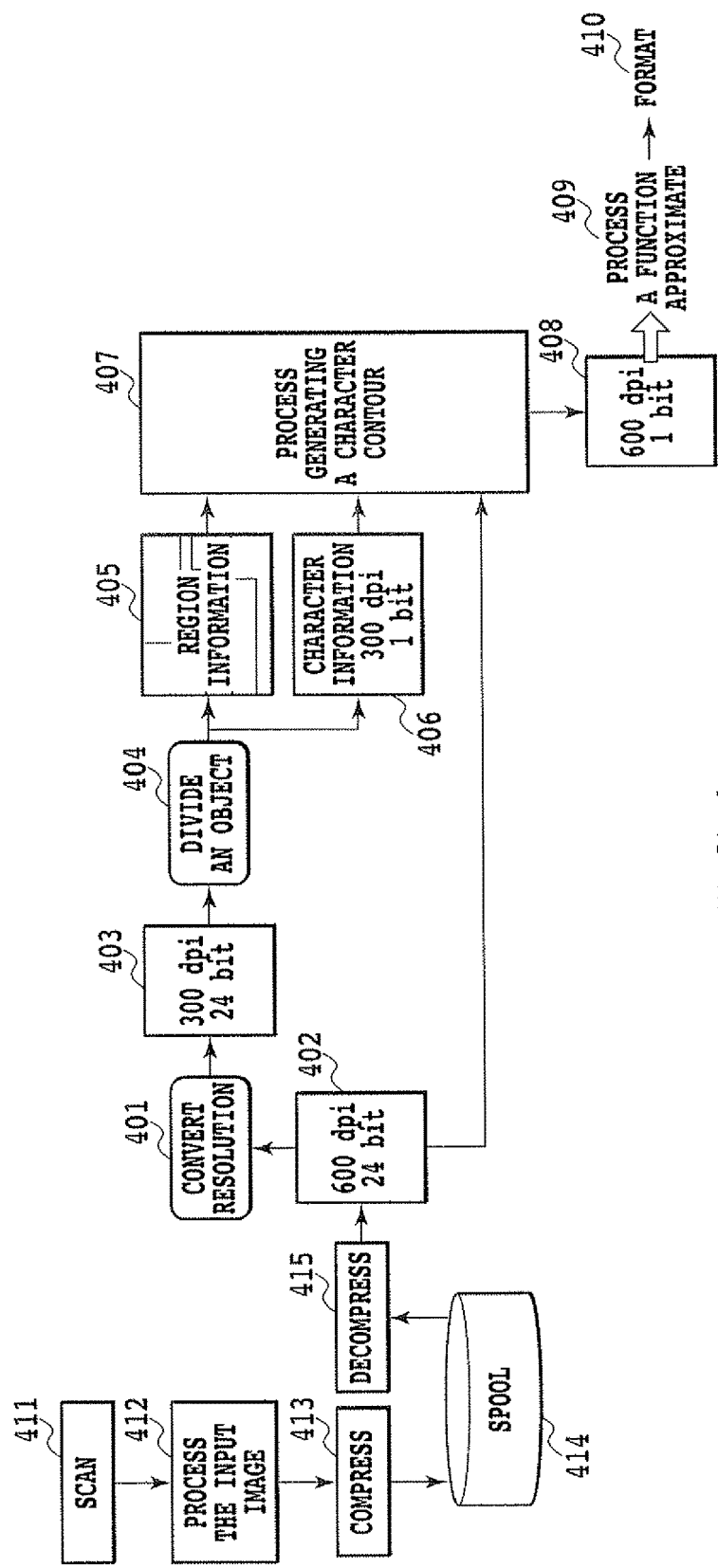
FIG. 4 is a schematic diagram illustrating the processes according to the first embodiment.

FIG. 4 is a diagram showing the aforementioned vectorization process.

The MFP 100 scans a document (411), performs an image process to the scanned image (412), and performs an image compression to the image-processed image data (413). In the present embodiment, the compressing method is JPEG.

The MFP 100 spools the compressed image data in the storage unit 111 (414), reads out the spooled compressed data for decompression (415), and generates image data with resolution of 600 dpi and the gradation number of 24 bits.

The MFP 100 performs resolution conversion for converting the generated image data with the resolution of 600 dpi and the gradation number of 24 bits (402) into an image with low resolution (401) to generate image data with resolution of 300 dpi and the gradation number of 24 bits. It should be noted that the above resolution or the above gradation number is used simply as an example, and the present invention is not limited thereto.

The MFP 100 performs an object division to the image data (403) with the resolution of 300 dpi and the gradation number of 24 bits (404) to find object division region information and character information (405 and 406). The object division region information serves to show in which region in the image and what kind of an object (object kind such as a character object) exists. That is, the object division region information (405) is the information showing position information of a rectangular region and an attribute of an object (object kind) contained in the rectangular region, and can be determined using a known technology. The character information (406) is the information showing a character object in the region where the character object exists. That is, the character information (406) is the information showing a region of the character attribute by binary image data (that is, image of 300 dpi and one bit), and can be obtained, for example, by binarizing the region of the character attribute. At this point, for example, in a case where an image as an object to be processed is an image of a black character with a white background, the character information is a binary image with low resolution in the character region where a pixel of the character is expressed as one and a pixel of the background which is not the character is expressed as zero.

The MFP 100 uses the object division region information, the character information, and the image data with the resolution of 600 dpi and the gradation number of 24 bits which is the image with the high resolution before the resolution conversion is made (after the decompression is performed) to perform a character contour generating process to be described later (407). By performing the character contour generating process (407), the character contour image data with resolution of 600 dpi and the gradation number of one bit can be obtained (408).

The MFP 100 performs a function approximate process to the character contour image data 408 to perform a passing process (409) and formats the path data (that is, vector data) (410).

Next, a detail of the character contour generating process (407) will be explained.

Figure 5:
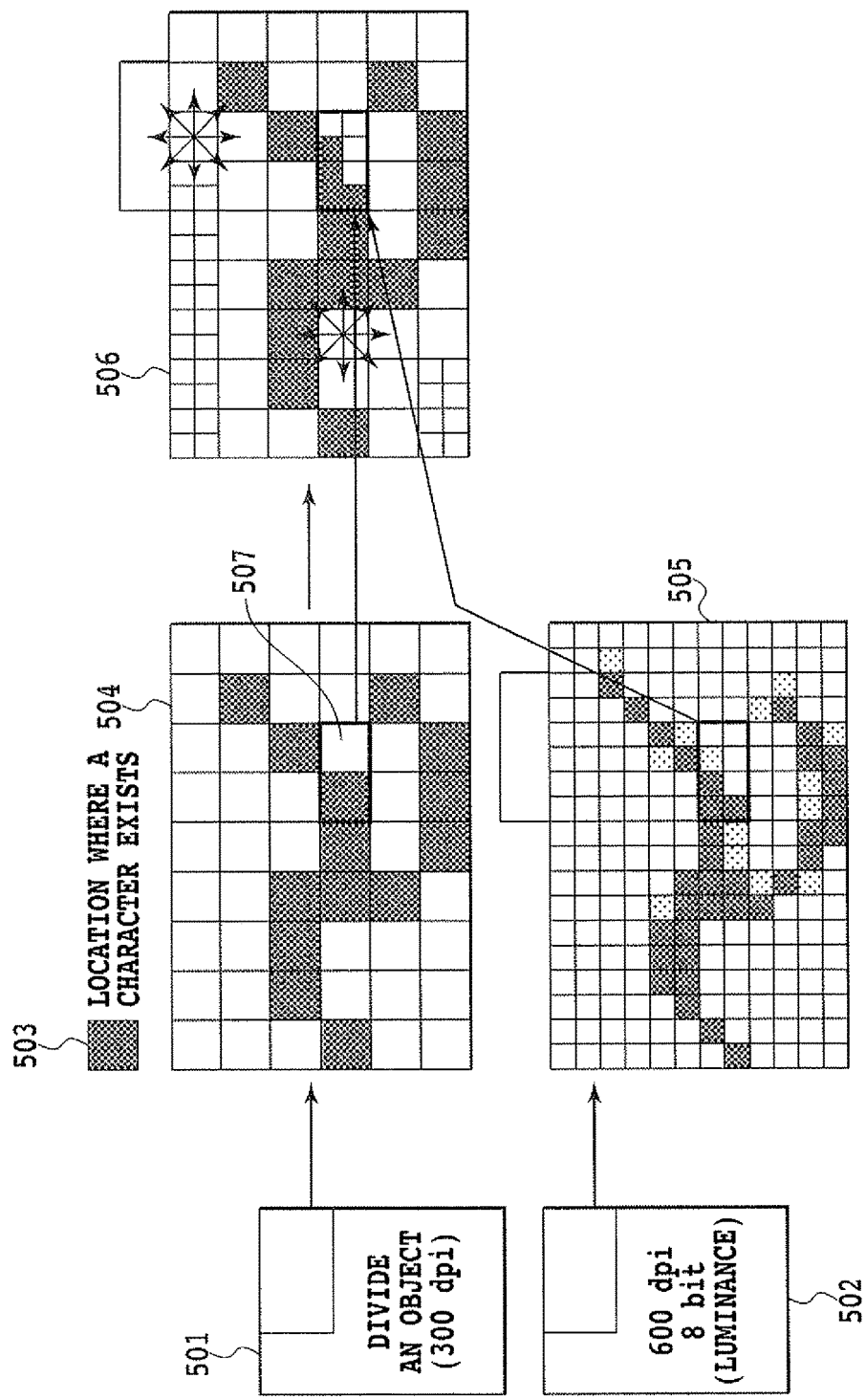
FIG. 5 is a schematic diagram illustrating the character contour generating process according to the first embodiment.

FIG. 5 is a diagram showing the character contour generating process (407).

Numeral 501 shows an image with low resolution including object division region information and character information. The resolution is set as 300 dpi. Numeral 502 shows a luminance image having resolution of 600 dpi and the gradation number of 8 bits generated from the image with the high resolution having resolution of 600 dpi and the gradation number of 24 bits. The generation of the luminance image is realized by a known method. For example, the process for converting a color image (RGB image) of 24 bits into a luminance image of 8 bits is to be performed using a given conversion expression.

Numeral 504 shows one region in the image 501 with resolution of 300 dpi. Herein, a position of a region of the character attribute is specified based upon region information 405, and the region is an image 504 with resolution of 300 dpi and the gradation number of one bit which is formed by taking out a portion of a region corresponding to the specified position of the region of the character from character information 406. The image 504 is a binary image, and pixels painted in black are, as shown in numeral 503, pixels for forming a character in the image 504. One square in the image shown in numeral 504 expresses one pixel in an image with low resolution.

Numeral 505 shows a region in the image with high resolution having resolution of 600 dpi and the gradation number of 8 bits corresponding to the region of the image 504. One square in the image in numeral 505 expresses one pixel in the image with the high resolution. It should be noted that the image 505 is a luminance image (multi-value image) and in most cases, a pixel in gray exists in the boundary between a pixel forming a character and a pixel forming the background.

Numeral 506 shows a character image having resolution of 600 dpi and the gradation number of one bit generated using the image 504 with the low resolution and the image 505 with the high resolution. That is, the image 506 is a binary image with the high resolution.

A method of generating the character image 506 is as follows.

The scan is carried out on the low-resolution image 504 having resolution of 300 dpi in raster sequence. At the time of scanning the low-resolution image 504, it is confirmed for each target pixel to be scanned whether or not a pixel constituting a character object exists in the 8 pixels surrounding the target pixel to be scanned. In a case where no pixel constituting a character object exists in the adjacent 8 pixels, the one pixel is divided into pixels of 2×2 (four pixels) to be converted into the image with resolution of 600 dpi, setting a pixel value of the each pixel as white (0). In contrast, in a case where a pixel (black pixel) constituting the character object exists in the 8 pixels surrounding the target pixel to be scanned, first, a threshold value calculating process in a portion of the pixel is performed using data of resolution of 600 dpi and the gradation number of 8 bits (multi-value image with high resolution). The data of the resolution of 600 dpi and the gradation number of 8 bits are binarized into 0 and 1 using the calculated threshold value. For example, an average value of pixel values of pixels constituting the character object existing in the 8 pixels surrounding the scan-target pixel and an average value of pixel values of pixels not constituting the character object existing in the 8 pixels are found from the image of the resolution of 600 dpi and the gradation number of 8 bits. Next, the respective average values are added, which is divided by two to find a threshold value. The pixel value is compared with the threshold value in the image of the resolution of 600 dpi and the gradation number of 8 bits. The pixel in which the pixel value exceeds the threshold value is set as black (1) and the pixel in which the pixel value is below the threshold value is set as white (0). Therefore, the character image of the resolution of 600 dpi and the gradation number of one bit (that is, a binary image with high resolution) can be generated. In this way, in regard to the adjacent pixel of the pixel where the character with the resolution of 300 dpi exists in the image 504, a threshold value is adaptively determined using the image of the resolution of 600 dpi and the gradation number of 8 bits to perform the binarization process. That is, since only a portion where a possibility that the character image exists is high is set as an object of the binarization process, a binary image showing a character contour with high resolution can be efficiently generated. For example, when a white pixel and a black pixel in a portion surrounded by a rectangle 507 in the image 504, since the pixels of the luminance image 505 with the high resolution corresponding to the white pixel and the black pixel contains a gray pixel, are binarized using the threshold value calculated in each pixel, the image 504 is formed as the image 506. It should be noted that there exists a case where as in the case of an outline character on a colored background, pixels in the surroundings of the character have colors and the character is shown in white. In this case, it is determined whether or not the character is the outline character on the colored background from the color in the surroundings and the color of the character, and, based upon this determination, generation of the character image of the resolution of 600 dpi and the gradation number of one bit is made. It is possible to use a known method in regard to the determination method of the outline character on the colored background. For example, at the time of generating the image of the resolution of 600 dpi and the gradation number of one bit, a total number of the black pixels is compared with a total number of the white pixels, and it is determined that more pixels are determined as the background pixels. In this case, when the black pixel is determined as the background pixel, reverse of white and black in the region may be made to form the white pixel as the background.

At the time of specifying the character region in this way, the image with the reduced resolution is used to perform the region division, and in regard to the character region, pixels where a character exists are specified in the image with the low resolution and in regard to the specified pixels, the image with the high resolution is used to generate a character contour. Therefore, the pixels of the character are specified in a small memory and at a high speed, making it possible to extract the character contour with high accuracy. For example, in a case of performing the vectorization process by extracting the character contour using only the image having resolution of 300 dpi, the generated vector data are formed to be an image as shown in FIG. 19 (1) by rendering. On the other hand, in a case of performing the vectorization process by extracting the character contour using the luminance image having resolution of 600 dpi while specifying the character pixel in the image having resolution of 300 dpi, a smooth image with high accuracy can be obtained as shown in FIG. 19 (2) by rendering the generated vector data.

[Production of Bit Map Image Data]

Figure 13:
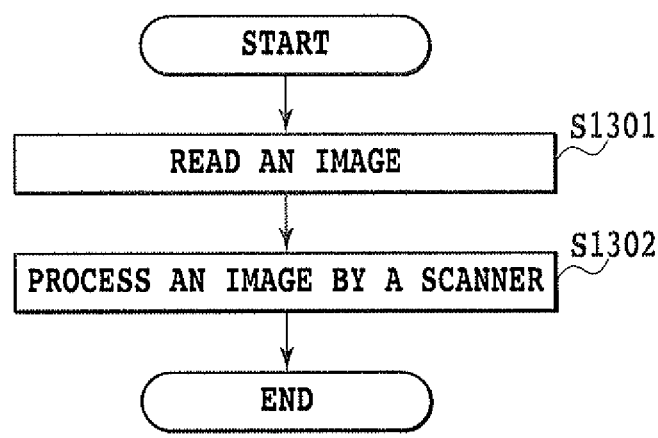
FIG. 13 is a flow chart showing image reading-in from a scanner.

In a case of using the image reading unit 110 in the MFP 100, at step S1301 shown in FIG. 13, an image is read in. The read image is already bit map image data. At step S1302, the image processing depending on a scanner is performed to the bit map image data. The image process depending on the scanner is, for example, a color process or a filtering process. On the other hand, application data produced using application software in the PC 102 are converted into PDL by a print driver in the PC 102, which are transmitted to the MFP 100. Herein, PDL is, for example, LIPS or Postscript. The MFP 100 which has received the PDL generates a display list based upon the PDL using a built-in interpreter. Next, MFP 100 performs rendering to the display list to generate the bit map image data.

The MFP 100 performs the processes (processes subsequent to 413 in FIG. 4) subsequent to step S303 (FIG. 3) using the bit map image data generated by either one of the above two methods as a process object.

[Detail Setting of Registration]

FIG. 18 is diagrams each showing an example of the format of the data vectorized in the function approximate process at step S309 shown in FIG. 3. In the present embodiment, an SVG (Scalable Vector Graphic) format is used, but the format is not limited thereto.

In FIG. 18, for its explanation, the notation of the object is surrounded by a frame. In a frame 1801, an image attribute is shown, and object division region information (information showing a position and an object attribute) and bit map information (for example, JPEG data) in regard to a region of the image object (photo object) are shown. In a frame 1802, information of a text object (information of an OCR result of a character object) is shown. In a frame 1803, a configuration of the character object corresponding to the text object in the frame 1802 is shown as a vector object. In a frame 1804, a graphic object (line art such as a table object or a line drawing object) is shown as a vector object. Also in regard to the graphic object such as the line drawing object, the process similar to the vector data converting process of the character object as explained in FIGS. 3 to 5 is performed, thereby making it possible to convert the graphic object into the vector object.

[Object Dividing Step]

Figure 14:
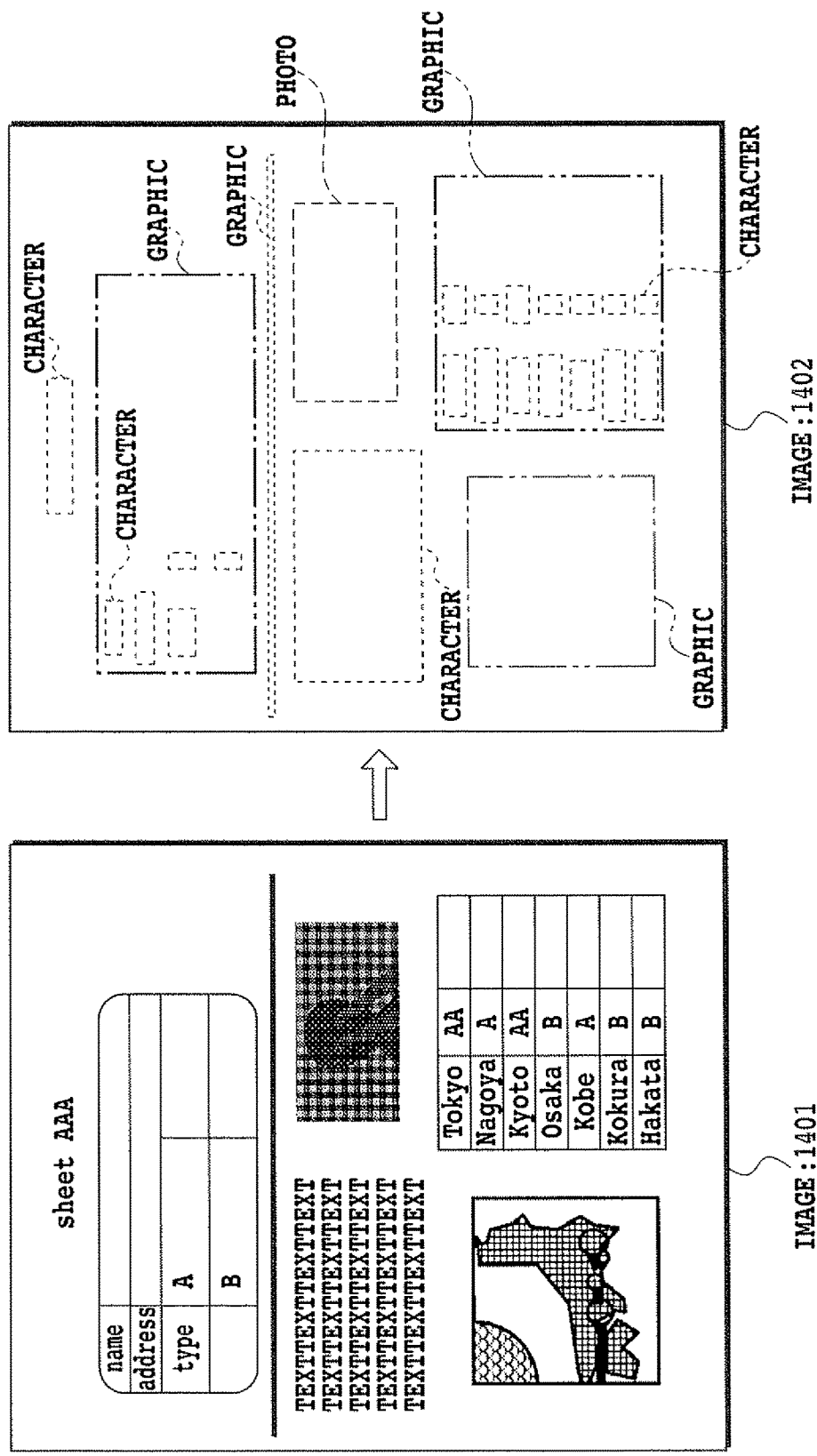
FIG. 14 is diagrams showing object division region information.

FIG. 14 is diagrams each showing the object division region information (405 in FIG. 4) obtained by the object dividing process (step S307 in FIGS. 3 and 404I FIG. 4).

At step S307, the MFP 100, as shown in an image 1402, divides an input mage 1401 into rectangular blocks for each attribute. As described above, examples of the attribute of the rectangular block include a character, a photo, and a graphic (drawing, line drawing, a table and the like).

In the object division at step S307, first, the image data (403) stored in the RAM are binarized into white data and black data to extract a black-pixel bundle (connected black pixels) surrounded by a contour made of black pixels. Further, a size of the extracted black-pixel bundle is calculated. In a case where the size of the black-pixel bundle is more than a predetermined value, a white-pixel bundle inside the black-pixel bundle is extracted to find the contour. Further, a size of the extracted white-pixel bundle is calculated. In a case where the size of the white-pixel bundle is more than a predetermined value, a black-pixel bundle inside the white-pixel bundle is extracted to find the contour. In this way, as long as the size of the internal pixel bundle is more than the predetermined value, the pixel bundle is repeatedly extracted to find the contour. The size of the pixel bundle is an area of the pixel bundle, for example. A rectangular block circumscribed to the pixel bundle obtained in this way is found to determine an attribute of the rectangular block based upon the size and the shape of the rectangular block. For example, a rectangular block of which a horizontal to vertical ratio is close to one and of which a size is within a constant range (range of a size as large as determined as a character) is determined as a character-corresponding block which has the high possibility to be a character object region rectangular block. In addition, when neighboring character-corresponding blocks are arranged regularly, a new rectangular block is generated by putting these character-corresponding blocks together to determine the new rectangular block as a character object region rectangular block. That is, since the neighboring character-corresponding blocks are put together, the character object region rectangular block is a region of a unit of a character line or a character paragraph. Further, a flat black-pixel bundle such as a longitudinal bundle or a horizontal bundle is determined as a line drawing region rectangular block such as a separator. In a case where the black-pixel bundle is larger than a constant value and square-shaped white-pixel bundles are arrange regularly inside the black-pixel bundle, the block is determined as a table region rectangular block. The line region rectangular block and the table region rectangular block are dealt as graphic region rectangular blocks. In addition, a black-pixel bundle in an indeterminate form other than the above blocks is determined as a photo region rectangular block. It should be noted that in the present embodiment, the attribute is categorized as a character, a photo, and a graphic, but the kind of the attribute is not limited to those and may be in more detail categorized.

At step S307, in regard to each of the rectangular blocks determined in this way, as shown in FIG. 15, block information of the attribute or the like and input file information are generated. In FIG. 15, the block information includes an attribute, a coordinate X, a coordinate Y, a width W, a height H and OCR information of each block. Numerals of 1 to 3 are allotted to the attribute. Numeral 1 shows a character object region rectangular block, numeral 2 shows a photo region rectangular block, and numeral 3 shows a graphic region rectangular block. The coordinate X and the coordinate Y show X and Y coordinates (coordinates of an upper left angle) at a starting point of each rectangular block in the image. The width W and the height H show a width of the rectangular block in the X coordinate direction and a height of the rectangular block in the Y coordinate direction. The OCR information shows presence/absence of pointer information in the input image. In addition, the input information includes a block sum N showing the numbers of the rectangular blocks (in a case of image 1402, N=six).

The block information for each rectangular block is used for vectorization in a specific region. It should be noted that in the present embodiment, since the character region is used as an object of the vectorization process, the specific region is the character region. That is, the character object region is extracted, which is used in the character contour generating process 407 at the later stage. Further, a relative position relationship at the time of combining the specific region with the other region can be specified by the block information, and therefore, it is possible to combine the vectorization region with the raster data region without damaging a layout of the input image.

Figure 16:
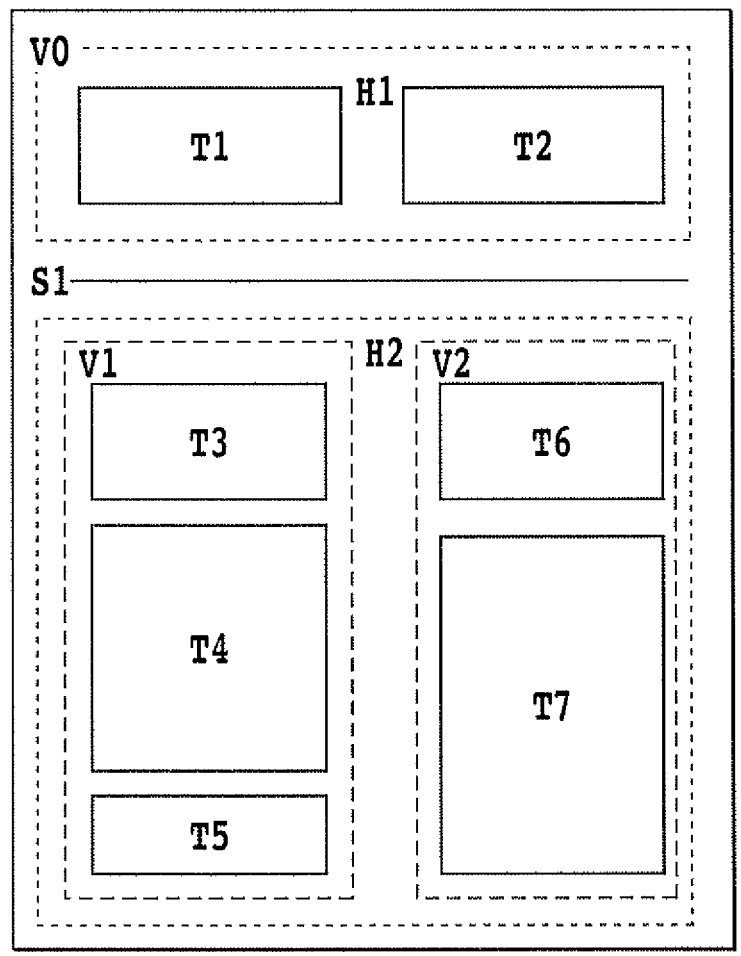
FIG. 16 is a diagram showing a document which is an object of a document structure tree generating process.

FIG. 16 is a diagram showing a document as an object of a document structure tree generating process.

In FIG. 16, rectangular blocks T1 and T2 are lined up laterally at the uppermost position of the document. A lateral separator S1 exists under the rectangular blocks T1 and T2 and rectangular blocks T3, T4, T5, T6, and T7 exist under the lateral separator S1. The rectangular blocks T3, T4, and T5 are longitudinally lined up from upward to downward at a left half in a region under the lateral separator S1 and the rectangular blocks T6 and T7 are lined up upward and downward at a right half in a region under the lateral separator S1.

Figure 17:
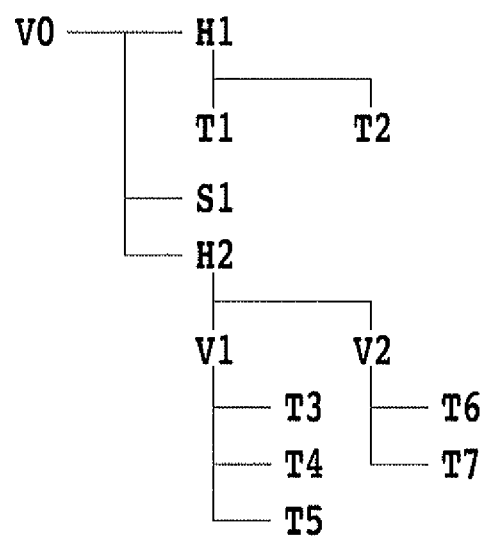
FIG. 17 is a diagram showing a document structure tree generated by the document structure tree generating process.

FIG. 17 is a diagram illustrating the above processed result in a document structure tree.

In FIG. 17, an input image V0 has groups H1 and H2 and the separator S1 at the uppermost layer, and the rectangular blocks T1 and T2 in the second layer belong to the group H1. Groups V1 and V2 at the second layer belong to the group H2, the rectangular blocks T3, T4, and T5 at the third layer belong to the group V1, and the rectangular blocks T6 and T7 at the third layer belong to the group V2.

Second Embodiment

A second embodiment is different from the first embodiment in a point of the decompressing process in an input image as the pre-process to the character contour generating process, and is common with the first embodiment in a point of the apparatus construction and the other processes. Therefore, the decompressing process which is different from the first embodiment will be mainly explained.

Figure 6:
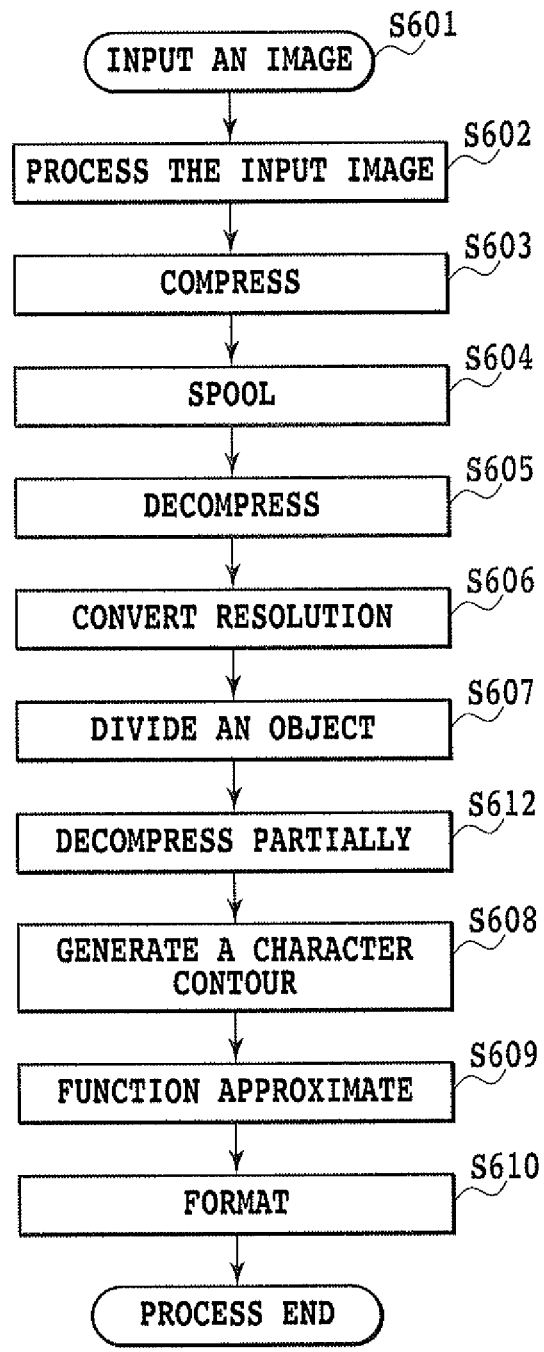
FIG. 6 is a flow chart showing the process flow according to a second embodiment.

FIG. 6 is a flow chart showing the process flow according to the second embodiment. Since the processes of steps S601 to S610 in FIG. 6 respectively are the processes similar to the processes of steps S301 to S310 in FIG. 3, a detail of the process at step S612 will be explained in the following.

At step S612, The MFP 100 performs a partial decompressing process for partially decompressing each of the several character object regions in the page using the object division region information obtained by the object dividing process at step S607. The processes at steps S608 and S609 are sequentially performed each time of obtaining the partial decompressed image. It is possible to perform the decompressing process and the vectorization process in a small memory capacity by performing the decompression in an object unit.

Figure 7:
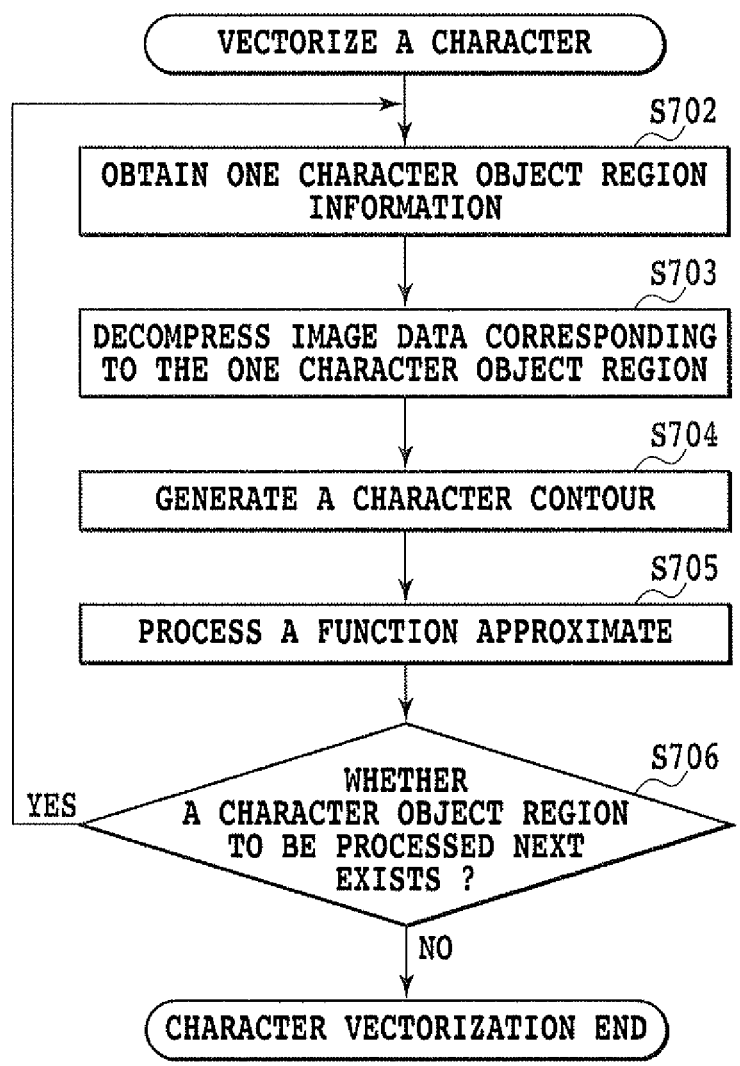
FIG. 7 is a flowchart showing the flow of the partial decompressing process according to the second embodiment.

FIG. 7 is a flow chart showing the process flow in the character vectorization process using the object division region information according to the second embodiment. The processes performed in FIG. 7 are the processes corresponding to steps S612, S608, and S609.

At step S702, the MFP 100 obtains the object division region information and obtains one character object region from the obtained object division region information.

A step S703, the MFP 100 partially decompress an input image corresponding to the one character object region. In a case where the object division region information is the information with resolution of 300 dpi, coordinates are calculated in a case where the resolution of 300 dpi in the information is converted into the resolution of 600 dpi. In addition, since the minimum unit of the compression is, for example, 8 pixels×8 pixels in a case of JPEG, the MFP 100 is adapted for decompressing a region of the compressed image corresponding to the obtained character object region. The method of the partial decompression differs depending on a compressing method to be used. However, it is possible to realize the partial decompression by using a known compression technology and a known partial decompressing method. In this way, it is possible to obtain the high-resolution image with resolution of 600 dpi corresponding to the one character object region.

At step S704, the MFP 100 performs the character contour generating process. The character contour generating process is the same as the process explained in the first embodiment.

At step S705, the MFP 100 performs a function approximate process to the character contour generated at step S704 to generate path-processed vector data.

At step S706, the MFP 100 determines whether or not the above process is already performed in all the character object regions. When the above process is completed in all the character object regions, the vectorization process is completed.

FIG. 8 is diagrams explaining a case where the object division region information with resolution of 300 dpi is converted into coordinates of positions corresponding to an image with resolution of 600 dpi to perform a partial decompressing process (step S812).

FIG. 8A is a diagram showing a compressed image 801 with resolution of 600 dpi. FIG. 8B is a diagram showing the object division region information as an image 802. The TEXTs 808 to 812 in the image 802 each express a character object region. In a case of partially decompressing the character object region (TEXT) 808 in the image 802, coordinates of the compressed image 801 corresponding to the coordinates of the character object region 808 are found to specify a region of the compressed image containing the coordinates, decompressing the compressed image in the region. Numerals 813 to 817 in FIG. 8C show the result of the partial decompressing process to each region of numerals 803 to 807 in positions in the compressed image 801 corresponding to the numerals 813 to 817 by using the object division region information 802 shown in numerals 808 to 812 in FIG. 8B. For example, numeral 813 (ABCD) in FIG. 8C shows the result of the partial decompressing process to the region 803 of the compressed image (600 dpi) corresponding to the character object region 808 in FIG. 8B.

As explained above, by performing the decompressing process only to the region of the partially required compressed image by using the object division region information, it is possible to perform the vectorization process while restricting a memory capacity at the time of performing the character contour generation.

Third Embodiment

A third embodiment is different from the second embodiment in a point of the decompressing process of an input image as the pre-process to the character contour generating process, and is common with the second embodiment in a point of the apparatus construction and the other processes. In the second embodiment, the partial decompression is performed for each character region (each character line or each paragraph), but in the third embodiment, the partial decompression is performed for each one character in the character region. Therefore, the decompressing process which is different from the second embodiment will be explained.

The second embodiment performs the partial decompression to the one character object region. In a case of the second embodiment, when the one character object region (paragraph or character line) is large, a memory capacity necessary for the process becomes possibly insufficient, but the third embodiment can cope with such a case.

Figure 9:
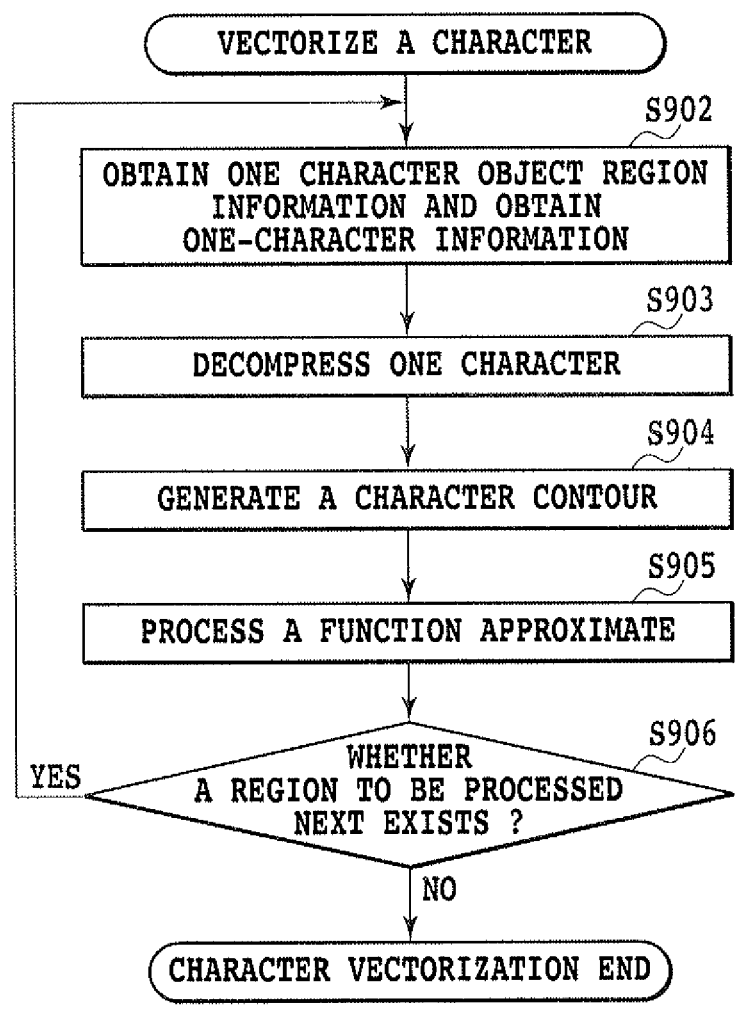
FIG. 9 is a flow chart showing the flow of a one-character decompressing process according to a third embodiment.

FIG. 9 is a flow chart showing the process flow of the character vectorization process using object division region information according to the third embodiment.

At step S902, the MFP 100 obtains object division region information and one-character information for cutting out one character from one character object region. Information for cutting out the one character from the one character object region, that is, coordinates of the one character can be obtained from the object division region information.

At step S903, the MFP 100 partially decompress an input image corresponding to the coordinates. For example, in a case where the object division region information is the information with resolution of 300 dpi, coordinates in a case where the resolution of 300 dpi is converted into resolution of 600 dpi are calculated. In addition, since the minimum unit of the compression is, for example, 8 pixels×8 pixels in a case of JPEG, the MFP 100 is adapted for decompressing a region of the compressed image in which the calculated character object region is contained. The method of the partial decompression differs depending on a compressing method to be used. However, it is possible to realize the partial decompression by using a known compression technology and a known partial decompressing method. In this way, it is possible to obtain the image with resolution of 600 dpi corresponding to one character. The character element pixel and the image with 600 dpi can be obtained from the object division.

At step S904, the MFP 100 performs the character contour generating process. The character contour generating process is the same as the process explained in the first embodiment.

At step S905, the MFP 100 performs a function approximate process to the character contour generated at step S904 to generate a path-processed vector data.

At step S906, the MFP 100 determines whether or not the above process is already performed in all the character objects.

Figure 10:
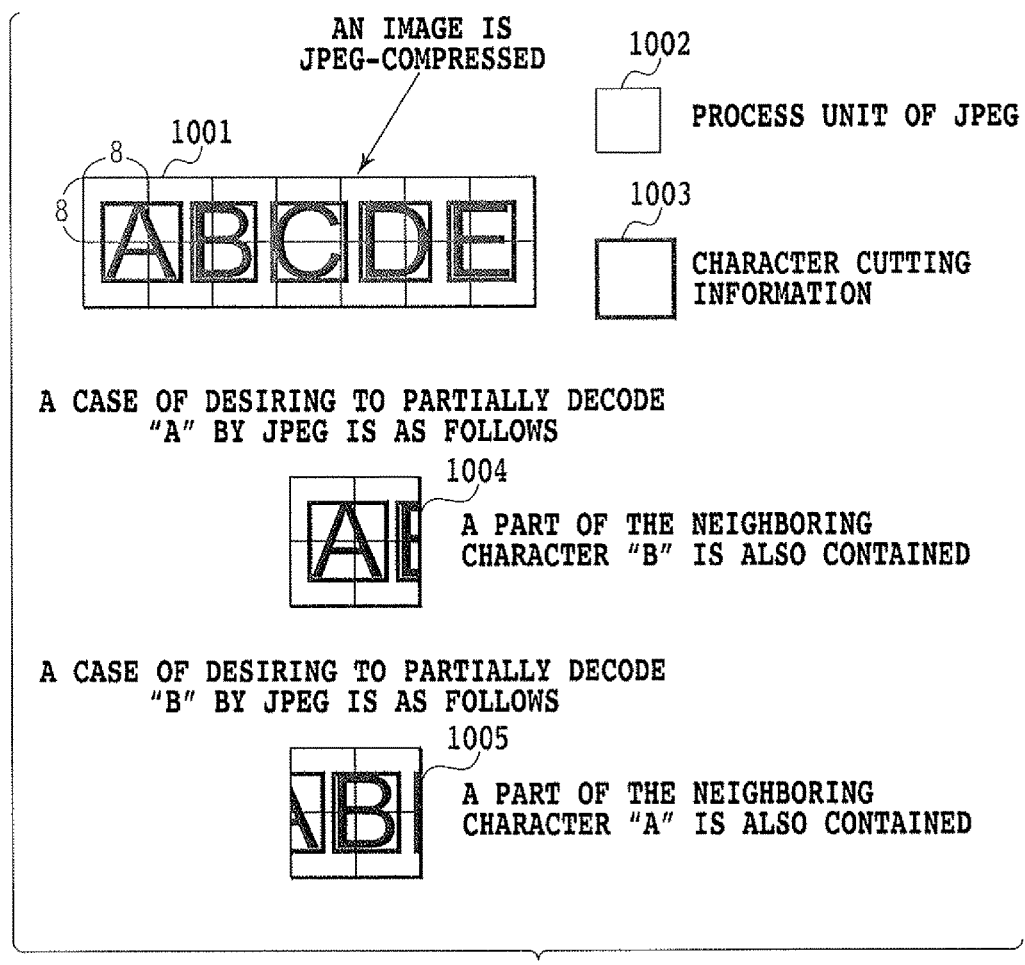
FIG. 10 is a diagram explaining the flow of the one-character decompressing process according to the third embodiment.

FIG. 10 is diagrams explaining utility of partially performing the decompressing process for each character (one-character decompression).

Numeral 1001 shows an image JPEG-compressed in a compressing unit of 8 pixels×8 pixels. Numeral 1002 shows a compressing unit of JPEG compression. In the image 1001, a frame surrounding each character shows character-cutting information 1003. The character-cutting information 1003 shows a character determined as one character in the object dividing process. Since the decompression is performed in a compressing unit of JPEG, in a case of desiring to decompress a character of "A", a part of "B" of a character in the right side adjacent to "A" is also decompressed as shown in numeral 1004. In addition, in a case of desiring to decompress a character of "B", likewise a part of "A" of a character in the left side adjacent to "B" is also decompressed as shown in numeral 1005. Therefore, when the image partially decompressed by JPEG is vectorized as it is (character contour generating process and function approximate process), a part of the neighboring character is also to be processed. Accordingly, in the present embodiment, in the image partially decompressed, the vectorization process is performed only to the region of the one character specified by the character-cutting information 1003. It should be noted that the processes of steps S904 and S905, as shown in FIG. 5, set the region of the one character as an object and perform the character contour generation using the image data with high resolution and the element constituting the character obtained from the object division.

Fourth Embodiment

A fourth embodiment is different from the third embodiment in a point of the decompressing process of an input image as the pre-process to the character contour generating process, and is common with the third embodiment in a point of the apparatus construction and the other processes. Therefore, the decompressing process which is different from the third embodiment will be explained.

The third embodiment performs the partial decompressing process to the one character. In the third embodiment, as the number of the characters increases, the process time possibly increases, but the fourth embodiment can cope with such a case.

Figure 11:
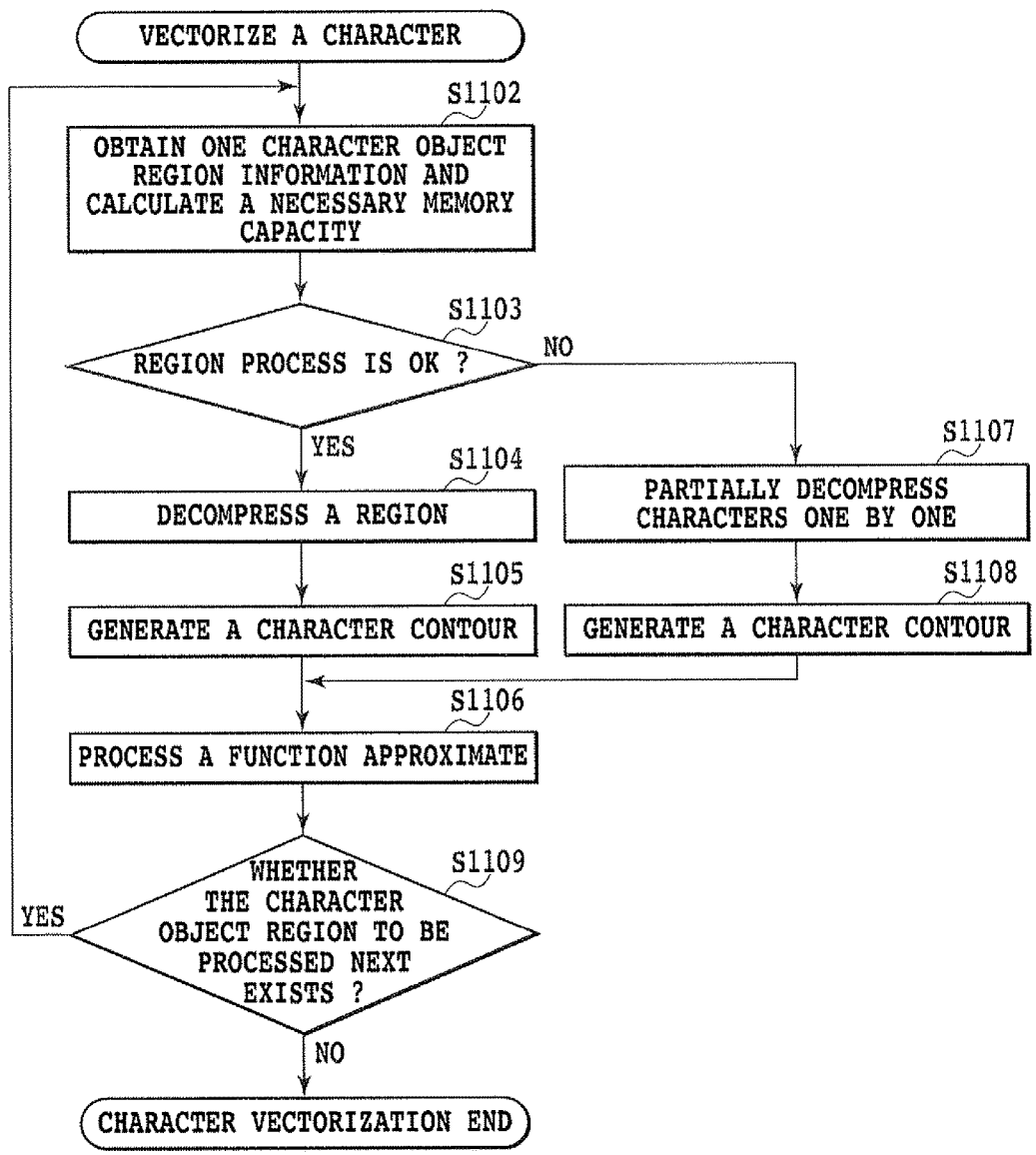
FIG. 11 is a flow chart showing the flow of a decompressing process according to a fourth embodiment.

FIG. 11 is a flow chart showing the process flow of the character vectorization process using object division region information according to the fourth embodiment.

At step S1102, the MFP 100 obtains object division region information and information for cutting out one character from one character object region (region of a character line or a paragraph). Further, the MFP 100 calculates the size of the character object region from the object division region information to calculate a memory capacity necessary for the region process (memory capacity calculation).

At step S1103, the MET 100 compares a usable memory capacity in advance set with the memory capacity necessary for the region process calculated at step S1102. As a comparison result, in a case where the memory capacity necessary for the region process is smaller than the given usable memory capacity, it is determined that the region process is possible, and the process goes to step S1104. In a case if not, the process goes to step S1107.

In a case where it is determined that the memory capacity necessary for the region process is smaller than the given usable memory capacity, the MFP 100 performs the decompressing process to one character object region (region of a character line or a paragraph).

At step S1105, the MFP 100 performs a character contour generating process (first character contour generating process).

On the other hand, in a case where it is determined that the memory capacity necessary for the region process is larger than the given usable memory capacity, at step S1107 the MET 100 performs the decompressing process to the characters in the character object region one by one (one-character decompression). The one-character decompression is as described above.

At step S1108, the MFP 100 performs a character contour generating process (second character contour generating process).

At step S1106, the MFP 100 performs a function approximate process to the character contour generated at step S1105 or the character contour generated at step S1108 to generate path-processed vector data.

At step S1109, the MFP 100 determines whether or not the above process is already performed in all the character objects.

Fifth Embodiment

A fifth embodiment is different from the fourth embodiment in a point of the decompressing process of an input image as the pre-process to the character contour generating process, and is common with the fourth embodiment in a point of the apparatus construction and the other processes. Therefore, the decompressing process which is different from the fourth embodiment will be explained.

The fourth embodiment performs the partial decompressing process to one character. In the fourth embodiment, a method of performing the decompressing process to the character object region as it is and a method of performing the decompressing process to the characters in the character object region one character by one character are switched depending on a size of the one character object region (that is, a required memory capacity). However, even in the fourth embodiment, when the character object region is large, since the decompressing process is performed for each one character, as the number of the characters increases, the process time possibly increases. The fifth embodiment can cope with such a case.

Figure 12:
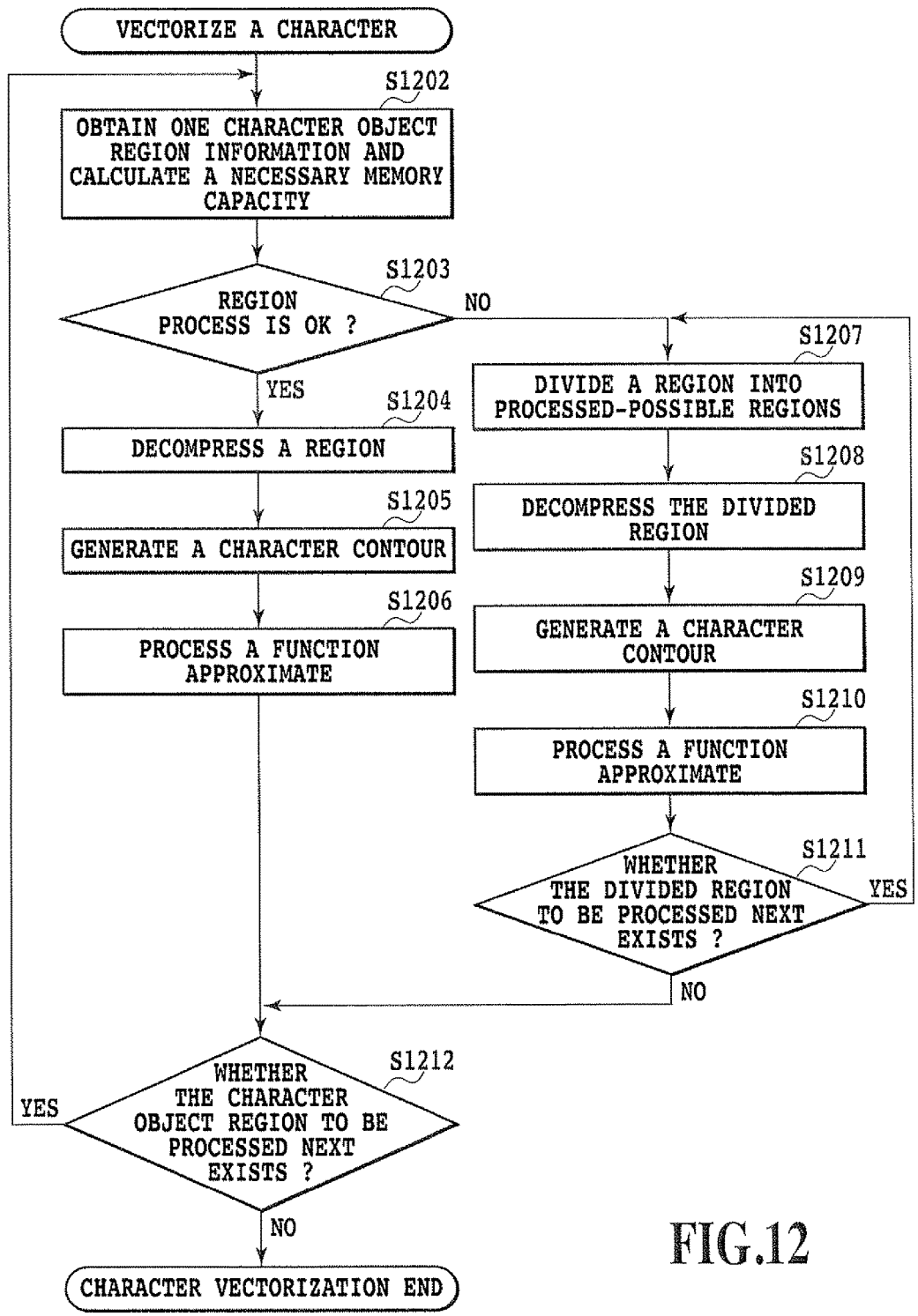
FIG. 12 is a flow chart showing the flow of a decompressing process according to a fifth embodiment.

FIG. 12 is a flow chart showing the process flow of the character vectorization process using object division region information according to the fifth embodiment.

At step S1202, the MFP 100 obtains object division region information and information for cutting out one character from one character object region. Further, the MFP 100 calculates a size of the character object region from the object division region information to calculate a memory capacity necessary for the region process (memory capacity calculation).

At step S1203, the MFP 100 compares a usable memory capacity in advance set with the memory capacity necessary for the region process calculated at step S1202. As a comparison result, in a case where the memory capacity necessary for the region process is smaller than the given usable memory capacity, it is determined that the region process is possible, and the process goes to step S1204. In a case if not, the process goes to step S1207.

In a case where it is determined that the memory capacity necessary for the region process is smaller than the usable memory capacity, at step S1204 the MFP 100 performs the decompressing process to the one character object region.

At step S1205, the MFP 100 performs a character contour generating process (first character contour generating process).

At step S1206, the MFP 100 performs a function approximate process to the character contour generated at step S1205 to generate path-processed vector data.

On the other hand, in a case where it is determined that the memory capacity necessary for the region process is larger than the usable memory capacity, at step S1207 the MFP 100 divides the one character object region into region process-possible regions. In regard to the division of the region, a size of the region process-possible region is calculated from a given usable memory capacity, and the division of the region is made based upon the calculated size of the region. At this point, the division is designed to be made to contain plural characters.

At step S1208, the MFP 100 partially decompress the region divided at step S1207.

At step S1209, the MFP 100 performs a character contour generating process (second character contour generating process).

At step S1210, the MFP 100 performs a function approximate process to the character contour generated at step S1209 to generate path-processed vector data.

At step S1211, the MFP 100 determines whether or not the above process is already performed in all the divided regions.

At step S1212, the MFP 100 determines whether or not the above process is performed to the character object region.

FIG. 19 shows an example of an improvement on an image quality.

Other Embodiment

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment (s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2008-239809 filed Sep. 18, 2008 which is hereby incorporated by reference herein in its entirety.

What is claimed is:

1. An image processing method of an image processing apparatus for vectorizing an outline of a character in a compressed multivalued image, the method comprising:
   generating a low resolution image having a lower resolution than that of the compressed multivalued image, from the compressed multivalued image;
   obtaining coordinates of a character region in the low resolution image by analyzing the low resolution image;
   calculating coordinates with the resolution of the compressed multivalued image based on the coordinates of the character region obtained in the low resolution image;
   partially decompressing a region of the compressed multivalued image, wherein the partially decompressed region is a character region corresponding to the calculated coordinates;
   specifying pixels where a character exists in the low resolution image;
   generating, based on the specified pixels and the partially decompressed region, a binary character image having the resolution equal to that of the compressed multivalued image;
   generating an outline of a character based on the generated binary character image having the resolution equal to that of the compressed multivalued image; and
   generating vector data by performing a function approximate process to the generated outline of the character.

2. The image processing method according to claim 1, wherein the low resolution image is a multivalued image.

3. The image processing method according to claim 1, wherein the generating of the outline of the character includes:
   tracing a boundary between the character pixel and the non-character pixel in the generated binary character image to identify the outline of the character.

4. The image processing method according to claim 1, further comprising sending an electronic file including information of the vectorized outline to an external device.

5. An image processing apparatus which vectorizes an outline of a character in a compressed multivalued image, the apparatus comprising:
   a memory storing instructions; and
   at least one processor configured to cause the following operations according to the instructions:
   generating a low resolution image having a lower resolution than that of the compressed multivalued image, from the compressed multivalued image;
   obtaining coordinates of a character region in the low resolution image by analyzing the low resolution image;
   calculating coordinates with the resolution of the compressed multivalued image based on the coordinates of the character region obtained in the low resolution image;
   partially decompressing a region of the compressed multivalued image, wherein the partially decompressed region is a character region corresponding to the calculated coordinates;
   specifying pixels where a character exists in the low resolution image;
   generating, based on the specified pixels and the partially decompressed region, a binary character image having the resolution equal to that of the compressed multivalued image;
   generating an outline of a character based on the generated binary character image having the resolution equal to that of the compressed multivalued image; and
   generating vector data by performing a function approximate process to the generated outline of the character.

6. The image processing apparatus according to claim 5, wherein the low resolution image is a multivalued image.

7. The image processing apparatus according to claim 5, wherein the generating of the outline of the character includes:
   tracing a boundary between the character pixel and the non-character pixel in the generated binary character image to identify the outline of the character.

8. The image processing apparatus according to claim 5, further comprising sending an electronic file including information of the vectorized outline to an external device.

* * * * *